United States Patent [19]
Gellert

[11] Patent Number: 5,268,184
[45] Date of Patent: Dec. 7, 1993

[54] INJECTION MOLDING NOZZLE WITH REMOVABLE FORWARD MEMBER

[76] Inventor: Jobst U. Gellert, 7A Prince Street, Georgetown, Ontario, Canada, L7G 2X1

[21] Appl. No.: 931,208
[22] Filed: Aug. 17, 1992

[30] Foreign Application Priority Data
Jul. 13, 1992 [CA] Canada ................... 2073710

[51] Int. Cl.⁵ .............................................. B29C 45/20
[52] U.S. Cl. ............................... 425/190; 264/328.15; 425/192 R; 425/549; 425/570; 425/572
[58] Field of Search ............... 425/547, 548, 549, 567, 425/568, 570, 572, 185, 190, 192 R; 264/328.15

[56] References Cited
U.S. PATENT DOCUMENTS
4,652,230 3/1987 Osuna-Diaz .................... 425/549
4,663,811 5/1987 Gellert .
4,810,184 3/1989 Gellert et al. .................... 425/549

FOREIGN PATENT DOCUMENTS
2044793-1 6/1991 Canada .

Primary Examiner—Tim Heitbrink
Attorney, Agent, or Firm—Dalesman & Company

[57] ABSTRACT

A heated injection molding nozzle having a rear member and a forward member which is removable. A channel extends through the rear and forward members to convey pressurized melt to one or more gates extending through the mold to a cavity. The rear member has an electrical heating element with a spiral portion which extends around the melt channel. The forward member has a tapered rear portion which extends rearwardly into a matching tapered well in the rear member. The taper is sufficient so the tapered portion is frictionally retained in the well to removably mount the forward member to the rear member. This allows the forward member to be easily turned or driven out of engagement in the well to replace it with a new forward member or a forward member having a different configuration to provide a different type or arrangement of gating.

8 Claims, 4 Drawing Sheets

INJECTION MOLDING NOZZLE WITH REMOVABLE FORWARD MEMBER

BACKGROUND OF THE INVENTION

This invention relates generally to injection molding and more particularily to a heated nozzle having a forward member which is removable for replacement.

Different types of valve and sprue gating for single and multiple cavities such as hot tip gating and edge gating are well known in the art. Previously, different heated nozzles having the appropriate configuration have been required for each type of gating. In fact, the applicant's U.S. Pat. No. 4,663,811 which issued May 12, 1987 describes a method facilitating the manufacture of nozzles having different configurations for different types of gating. However, these previous nozzles all had the disadvantage for both the manufacturer and user that an entirely different nozzle had to be made and used for different type of gating. With the increasing number of different gating configurations, this has increased manufacturing and inventory costs considerably. Also, nozzles which became too worn near the gate had to be replaced entirely.

SUMMARY OF THE INVENTION

Accordingly, it is an object of the present invention to at least partially overcome the disadvantages of the prior art by providing a heated nozzle which is partially replaceable when worn or to change gating configurations.

To this end, in one of its aspects, the invention provides an injection molding nozzle to be mounted in a mold, the nozzle having a rear end, a forward end, and a melt channel extending there through to convey melt from an inlet at the rear end towards at least one gate extending through the mold to a cavity, the nozzle having an integral electrical heating element, the heating element having a terminal adjacent the real end of the nozzle and spiral portion extending in the nozzle around at least a portion of the melt channel, having the improvement wherein the nozzle comprises a rear member having a rear end which forms the rear end of the nozzle, a forward end, and a tapered well, the tapered well extending rearwardly and tapering inwardly from the forward end, the melt channel having a rear portion extending in alignment with the tapered well through the rear member from the inlet at the rear end to the tapered well, and a heat conductive forward member having a forward portion and a tapered rear portion, the forward member having a rear end and a forward end which forms the forward end of the nozzle, the melt channel having a forward portion extending through the forward member from the rear end, the tapered rear portion entending rearwardly and inwardly from the forward portion to the rear end to substantially match the shape of the tapered well of the rear member, the tapered rear portion of the forward member being received in the tapered well in the rear member with the rear portion and the forward portion of the melt channel meeting in alignment, the tapered well in the rear portion and the matching tapered rear portion of the forward member being tapered sufficiently to frictionally retain the tapered rear portion in the tapered well whereby the forward member is removably mounted to the rear member.

Further objects and advantages of the invention will appear from the following description taken together with the accompanying drawings.

DETAILED DESCRIPTION OF THE INVENTION

Figure 1:
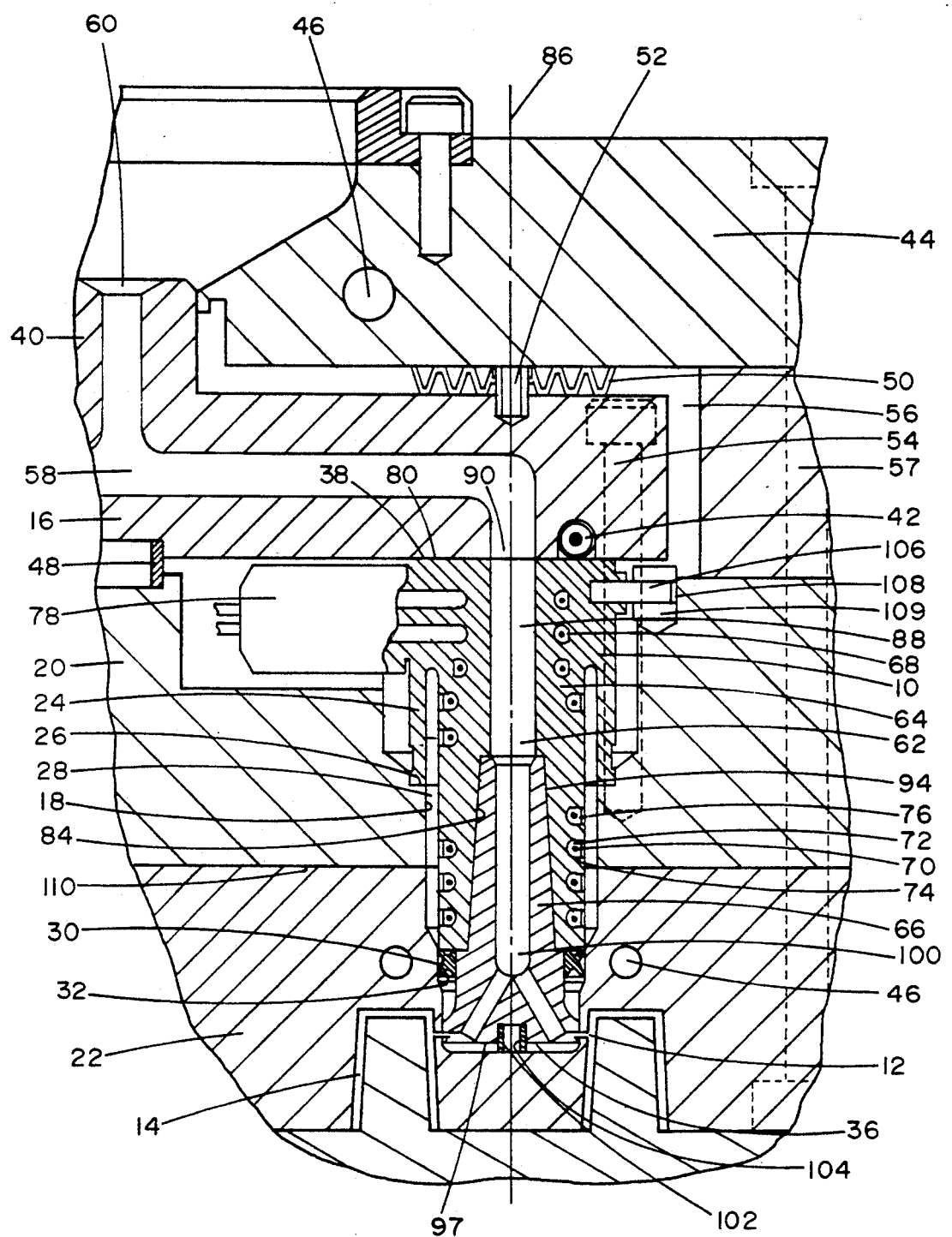
FIG. 1 is a partial sectional view of a portion of a multi-cavity edge gated injection molding system showing a nozzle according to one preferred embodiment of the invention.
Figure 2:
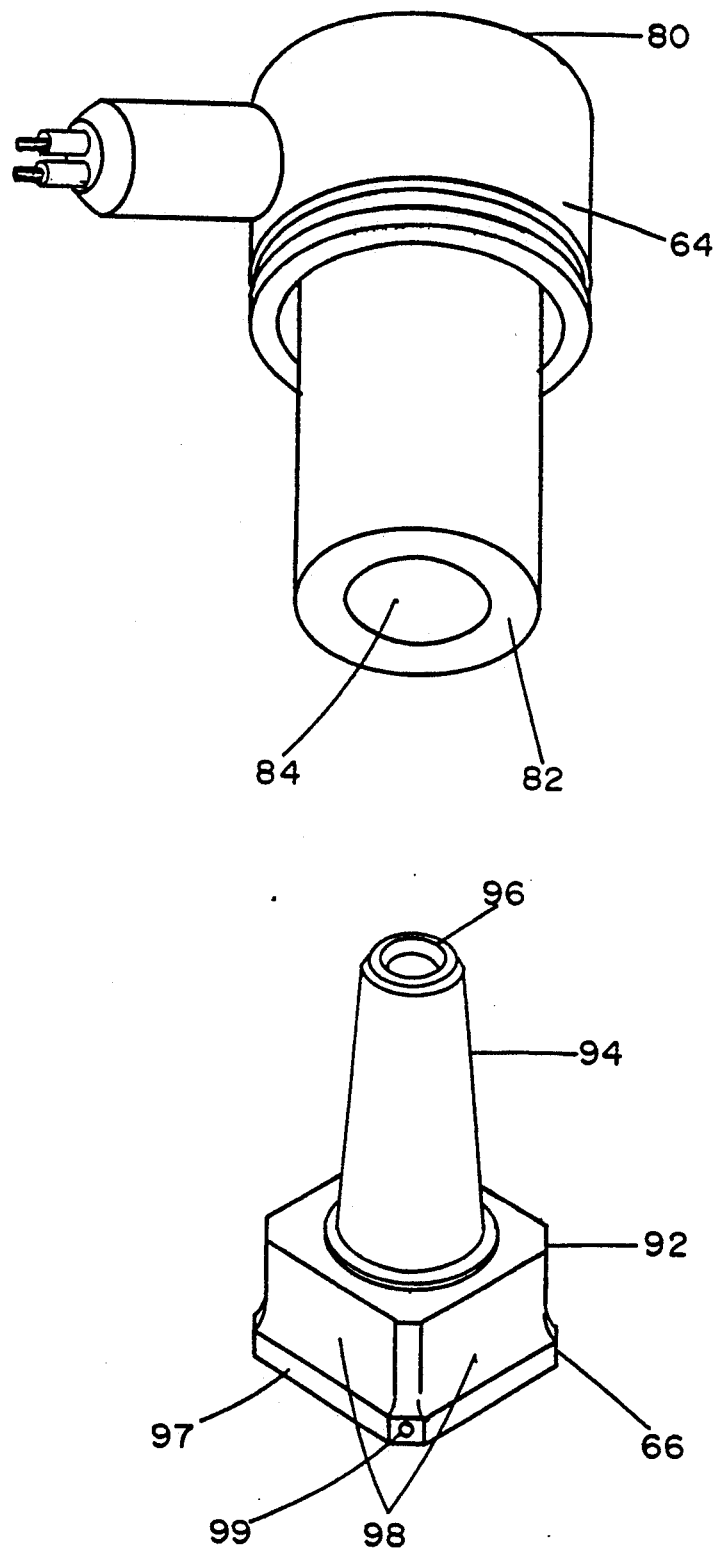
FIG. 2 is a isometric view of the same nozzle with the forward member in position to be mounted to the rear member.

Reference is first made to FIGS. 1 and 2 which show a portion of a multi-cavity injection molding system having heated nozzles 10 according to the invention as described in greater detail below. The nozzle 10 distributes melt to several spaced edge gates 12 leading to different cavities 14. While the system shown has a heated steel manifold 16 to distribute melt to several spaced nozzles 10, other systems may only have a single nozzle which receives melt directly from the molding machine (not shown). Each nozzle 10 is received in a well 18 which extends through a manifold retainer plate 20 into a cavity plate 22. The nozzle 10 has a circular insulation flange 24 which seats on a matching shoulder 26 in the retainer plate 20. As can be seen, the nozzle 10 and well 18 are shaped to securely locate the nozzle 10 in the well 18 with a minimum of contact across an insulative air space 28 provided between the heated nozzle 10 and the surrounding cooled mold. In this embodiment, a cylindrical seal 30 with a V-shaped forward face 32 is seated between the nozzle 10 and the cavity plate 22 to prevent pressurized melt leaking into the air space 28.

Each nozzle 10 has a forward end 36 and a rear end 38 against which the melt distribution manifold 16 abuts. The manifold 16 has a cylindrical inlet portion 40 and an electrical heating element 42 as described in the applicants' Canadian patent application serial number 2,044,793-1 filed Jun. 13, 1991 entitled "Injection Molding Manifold with Integral Heatd Inlet Portion". The manifold 16 is mounted between the manifold retainer plate 20 and a steel back plate 44. The manifold retainer plate 20 and the back plate 44 are cooled by pumping cooling water through cooling conduits 46. A locating ring 48 is seated between the manifold 16 and the manifold retainer plate 20 to accurately locate the manifold 16 in place. Insulative and resilient spacer members 50 are located between the manifold 16 and the back plate 44 by pins 52. The nozzles 10 and manifold 16 are held securely in this position by force from the spacer members 50 and also by bolts 54 which extend from the manifold 16 into the manifold retainer plate 20. This provides an insulative air space 56 between the heated manifold 16 and the adjacent cooled manifold retainer plate 20, spacer plate 57, and back plate 44. This also provides thermal separation by minimizing actual steel to steel contact between the heated and cooled components of the system. A melt passage 58 extends from a common inlet 60 in the inlet portion 40 of the manifold 16 and branches outward to each nozzle 10 where it extends through a melt channel 62.

Each nozzle 10 has a rear member 64 and a removable forward member 66. The rear member 64 is formed of tool steel and has an electrical heating element 68. The heating element 68 has a nickel-chrome resistance wire 70 extending through a refractory powder 72 such as magnesium oxide in a steel casing 74. It is integrally brazed in the rear member 64 and has a spiral portion 76 which extends in a predetermined configuration around the melt channel 62 to an external terminal 78. As can be seen, the rear member 64 has a rear end 80 which forms the rear end 38 of the nozzle 10, a forward end 82, and a tapered well 84. The tapered well 84 tapers slightly inwardly as it extends rearwardly from the forward end 82 along the longitudianally extending central axis 86 of the nozzle. The melt channel 62 has a rear portion 88 which extends through the rear member 64 from an inlet 90 at the rear end 80 to the tapered well 84. The rear portion 88 of the melt channel 62 also extends along the central axis 86 in alignment with the tapered well 84.

The removable forward member 66 of the nozzle 10 is preferably made of a heat conductive material such as a copper or silver alloy. It has a generally square forward portion 92 and a tapered rear portion 94. The forward member 66 has a rear end 96, a forward end 97 which forms the forward end 36 of the nozzle 10, and four flat sides 98 which flare outwardly to provide for four melt channel outlets 99 at the corners near the forward end 97. The tapered rear portion 94 tapers slightly inward as it extends rearwardly from the forward portion 92 to the rear end 96. The tapered rear portion 94 of the forward member 66 is shaped to match the tapered well 84 of the rear member 64 in which it is received. The degree of taper is just sufficient to frictionally retain the tapered portion 94 in the well 84 to securely mount the forward member 66 to the rear member 64, while allowing it to be twisted or driven out for removal. A taper of below seven degrees with respect to the central axis 86 has been found to be appropriate, although this can change somewhat for other situations. In this embodiment, the melt channel 62 through the nozzle 10 has a forward portion 100 which extends through the forward member 66 from the rear end 96 and branches to extend to the four outlets 99 leading to the edge gates 12. As can be seen, the forward portion 100 of the melt channel 62 meets at the rear end 96 of the forward member 66 in alignment with the rear portion 88 of the melt channel 62 to extend the melt passage 58 from the melt distribution manifold 16 to the respective gates 12.

In this embodiment of the invention, a support spacer 102 is shown seated in a seat 104 on the forward end 97 of the forward member 66. The support spacer 102 projects forwardly on the central axis 86 into contact with the cavity plate 22 to ensure the forward member 66 is retained in place. This support spacer 102 is not necessary if the degree of taper of the tapered rear portion 94 and tapered well 84 is sufficient to frictionally retain the forward member in place when subjected to very considerable melt speed and friction in the forward position 100 of the melt channel 62 prior to build up of back pressure between the nozzle well 84 and the forward end 97. Each nozzle 10 has a locating pin 106 which extends into an opening 108 in the retainer plate 20 where it is secured by a cam 109 to ensure the accurate alignment of the branches of the melt channel 62 with the respective gates 12.

In use, the injection molding system is assembled as shown in FIG. 1. Electrical power is applied to the heating element 42 in the manifold 16 and to the heating elements 68 in the nozzles 10 to heat them to a predetermined operating termperature. Pressurized melt from a molding machine (not shown) is then injected into the melt passage 58 through the common inlet 60 according to a predetermined cycle in a conventional manner. In this embodiment, the pressurized melt branches first in the manifold 16 and then in each nozzle 10 to the edge gates 12 to fill the cavities 14. After the cavities 14 are filled, injection pressure is held momentarily to pack and then released. After a short cooling period, the mold is opened to eject the molded products. After ejection, the mold is closed and injection pressure is reapplied to refill the cavities 14. This cycle is continuously repeated with a frequency dependent on the size and shape of the cavities and the type of material being molded. Eventually, the forward member 66 may become worn near the melt channel outlets 99 or elsewhere. If so, it can easily be removed for replacement. When the mold is opened for cleaning at the line 110 between the manifold retainer plate 20 and the cavity plate 22, the forward member 66 can be twisted by supplying a wrench to flat sides 98. Also, the nozzle 10 can easily be adopted for different types of gating by similarly removing the forward member 66 and replacing it by a forward member having a different configuration.

Figure 3:
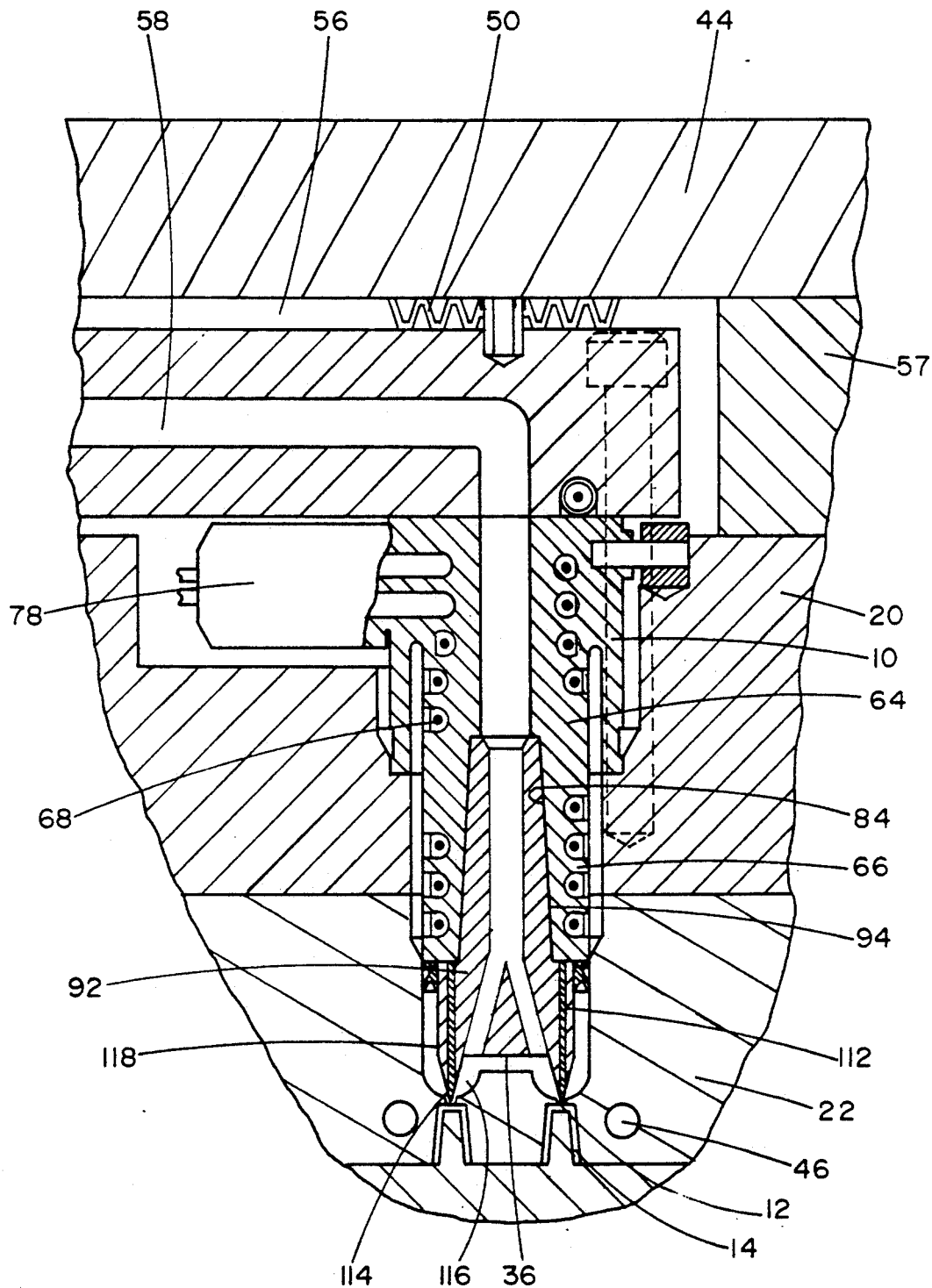
FIG. 3 is a partial sectional view of a portion of a multi-cavity hot tip gated injection molding system showing a nozzle according to another preferred embodiment of the invention.

Reference is now made to FIG. 3 to describe another embodiment of the invention. As most of the elements of this embodiment are the same as those of the embodiment described above, elements common to both embodiments are described and illustrated using the same refernce numerals. In this embodiment, the rear member 64 of the nozzle 10 is the same but the forward member 66 has been replaced by a forward member 66 having a different configuration for multi-cavity hot tip gating. In this case, elongated inserts 112 have been electron beam welded into the beryllium copper forward member 66. Each insert 112 has a pointed tip 114 which projects forwardly from the forward end 97 of the forward member 66 in alignment with one of the gates 12 extending through the cavity plate 22 to a cavity 14. The inserts 112 are formed of high speed steel to be resistant to wear and corrosion from the melt flowing around the pointed tip 114. The melt channel 62 branches in the forward portion 92 of the forward member 66 to convey melt to the space 116 between the forward end 36 of the nozzle 10 and the cavity plate 22 from where it flows around each pointed tip 114 into the respective cavity 14. In this embodiment, the combination of frictional engagement between the tapered rear portion 94 of the forward member 66 and the surrounding tapered well 84 in the rear member 64 and the melt back pressure in the nozzle well 84 is sufficient to securely retain the forward member 66 in place and no support spacer is required. The forward portion 92 of the forward member 66 similarly has flat sides 118 to facilitate twisting it with a wrench for removal. As indicated above, this embodiment merely shows one of many other possible configurations of the forward member 66 which can be used for different types and arrangements of gating.

Figure 4:
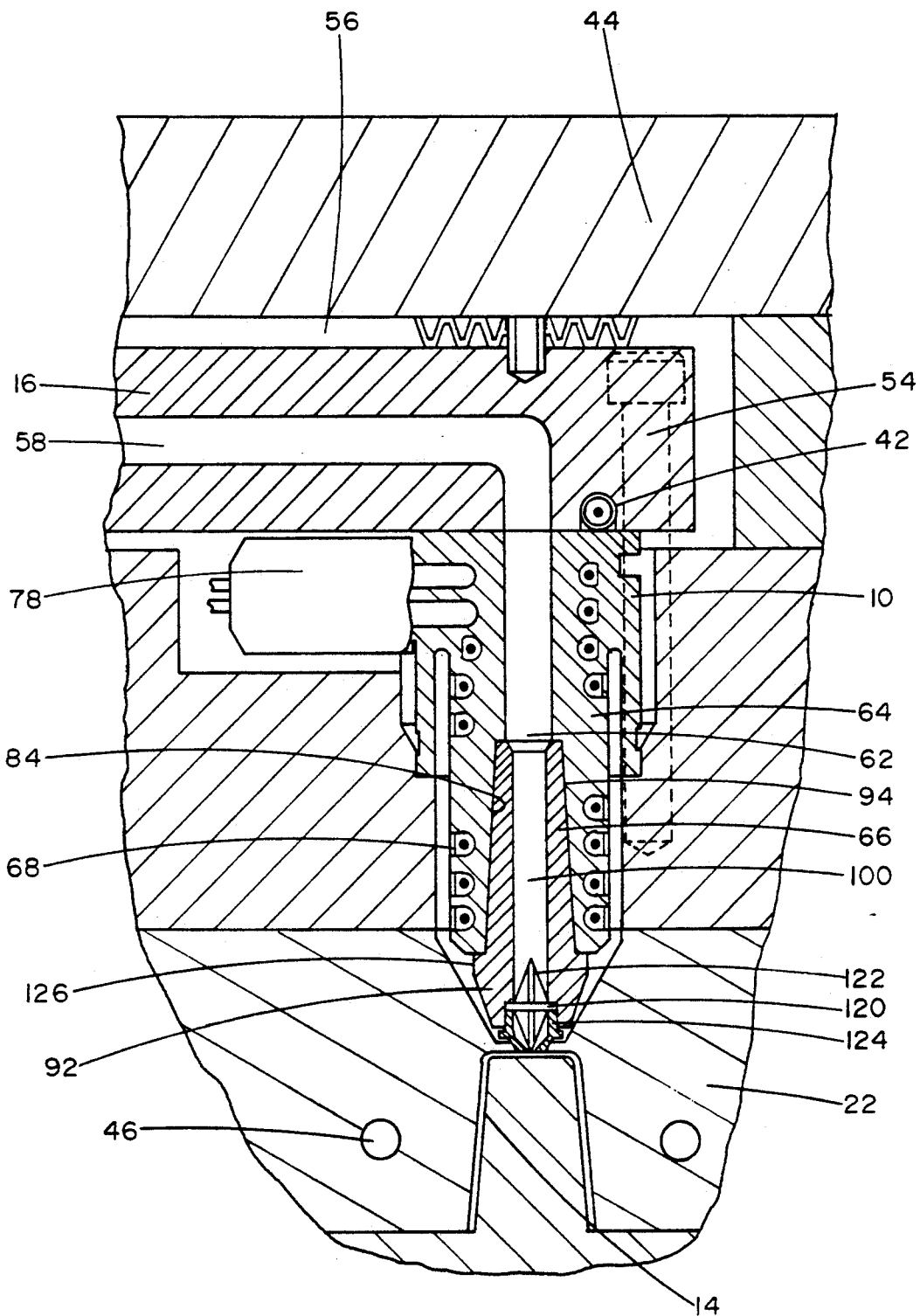
FIG. 4 is a partial sectional view of a portion of a torpedo gated injection molding system showing a nozzle according to a further preferred embodiment of the invention.

Reference is now made to FIG. 4 to describe a further embodiment of the invention with another configuration of the forward member 66 used for torpedo gating. The rear member 64 of the nozzle 10 is the same, but the forward member 66 has the forward portion 100 of the melt channel 62 extending centarlly therethrough. A torpedo 120 having spaced fins 122 sits against a gate insert 124 which provides a central gate 12 leading to the cavity 14. The forward portion 92 of the forward member 66 similarly has sides 126 which are flat to be engaged by a wrench to be turned for removal. In use, melt flows through between the spaced fins 122 of the torpedo 120 to the gate 12. The torpedo is used to conduct additional heat from upstream to the gate. This gating configuration is merely illustrative of many other arrangements for which the nozzle according to the invention is applicable.

While the description of the nozzles 10 has been given with respect to preferred embodiments, it will be evident that various modifications are possible without departing from the scope of the invention as understood by those skilled in the art and as defined in the following claims.

The embodiments of the invention in which an exclusive property or privilege is claimed are defined as follows:

1. In an injection molding nozzle to be mounted in a mold, the nozzle having a rear end, a forward end, and a melt channel extending therethrough to convey melt from an inlet at the rear end towards at least one gate extending through the mold to a cavity, the nozzle having an integral electrical heating element, the heating element having a terminal adjacent the rear end of the nozzle and a spiral portion extending in the nozzle around at least a portion of the melt channel, the improvement wherein the nozzle comprises;
   (a) a rear member having a rear end which forms the rear end of the nozzle, a forward end, and a tapered well, the tapered well extending rearwardly and tapering inwardly from the forward end, the melt channel having a rear portion extending in alignment with the tapered well through the rear member from the inlet at the rear end to the tapered well, and
   (b) a heat conductive forward member having a forward portion and a tapered rear portion, the forward member having a rear end and a forward end which forms the forward end of the nozzle, the melt channel having a forward portion extending through the forward member from the rear end of the forward member, the tapered rear portion of the forward member extending rearwardly and inwardly from the forward portion of the forward member to the rear end of the forward member to substantially match the shape of the tapered well of the rear member, the tapered rear portion of the forward member being received in the tapered well in the rear member with the rear portion and the forward portion of the melt channel meeting in alignment, the tapered well in the rear portion and the matching tapered rear portion of the forward member being tapered sufficiently to frictionally retain the tapered rear portion in the tapered well whereby the forward member is removably mounted to the rear member.

2. An injection molding nozzle as claimed in claim 1 wherein the nozzle has a longitudianally extending central axis and the melt channel extends centrally through the rear member and centrally through at least the tapered rear portion of the forward member along the central axis.

3. An injection molding nozzle as claimed in claim 2 wherein the melt channel branches in the forward portion of the forward member to extend towards a plurality of equally spaced gates.

4. An injection molding nozzle as claimed in claim 1 wherein the rear member is formed of steel and the forward member is formed of a beryllium copper alloy.

5. An injection molding nozzle as claimed in claim 3 wherein the forward end of the forward member has a seat on the central axis to receive a support spacer between the nozzle and the mold.

6. An injection molding nozzle as claimed in claim 3 wherein each of the plurality of gates extend forwardly through the mold to a cavity, and a corresponding plurality of wear resistant inserts are mounted in the forward portion of the forward member, each insert having a pointed tip which projects forwardly from the forward end of the forward member in alignment with one of the gates.

7. An injection molding nozzle as claimed in claim 6 wherein the wear resistant inserts are formed of high speed steel.

8. An injection molding nozzle as claimed in claim 1 wherein the tapered well in the rear portion and the matching tapered rear portion of the forward member taper approximately seven degrees with respect to the central axis.

* * * * *